G. B. GOETZ.
HORSE COLLAR.
APPLICATION FILED AUG. 29, 1916.
1,230,701. Patented June 19, 1917.
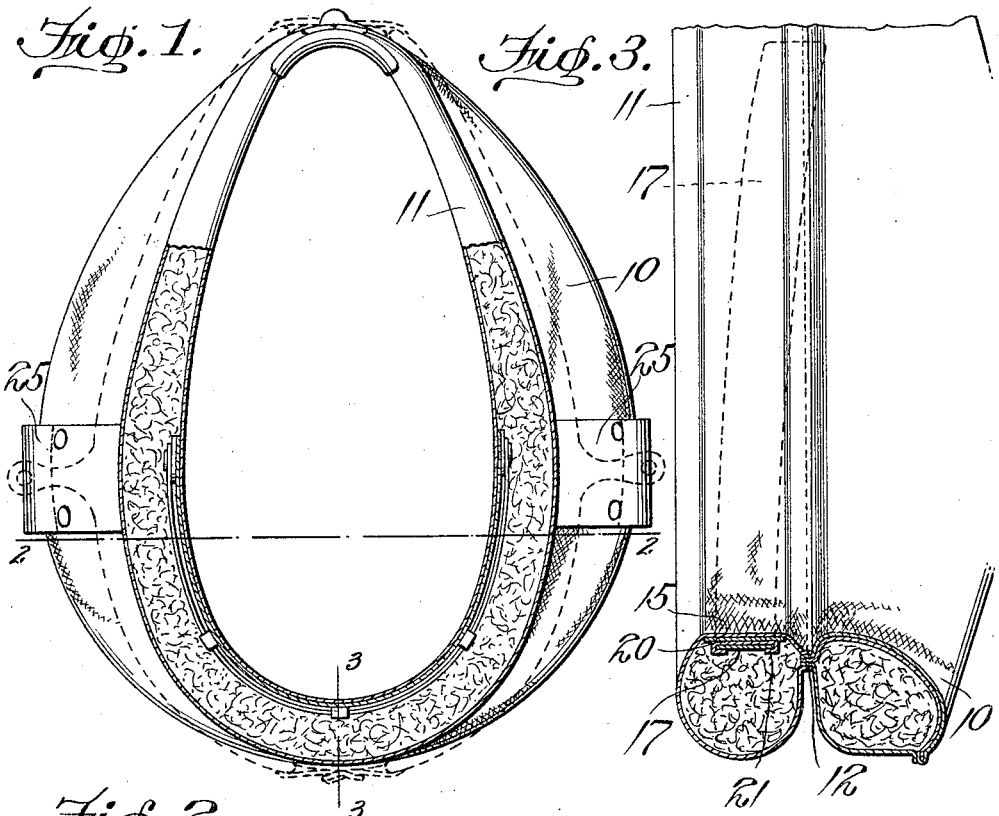
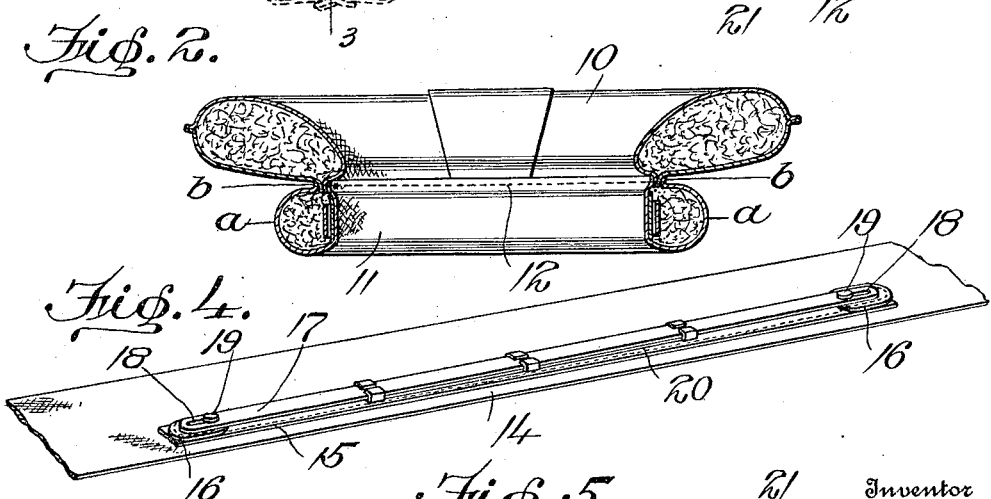
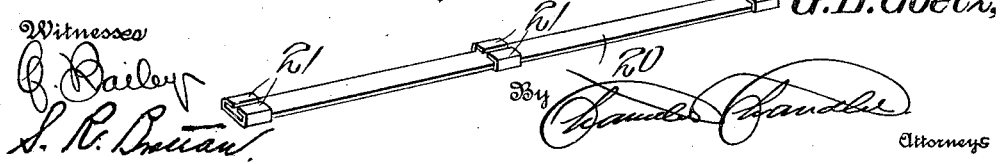
Witnesses
Inventor
G. B. Goetz,
By
Attorneys

UNITED STATES PATENT OFFICE.

GEORGE B. GOETZ, OF RANSON, WEST VIRGINIA.

HORSE-COLLAR.

1,230,701. Specification of Letters Patent. Patented June 19, 1917.

Continuation in part of applications Serial Nos. 61,982 and 61,983, filed November 17, 1915. This application filed August 29, 1916. Serial No. 117,493.

*To all whom it may concern:*

Be it known that I, GEORGE B. GOETZ, a citizen of the United States, residing at Ranson, in the county of Jefferson, State of West Virginia, have invented certain new and useful Improvements in Horse-Collars; and I do hereby declare the following to be a full, clear, and exact description of the invention, such as will enable others skilled in the art to which it appertains to make and use the same.

This invention relates specifically to fabric horse collars as distinguished from collars made of leather or other material commonly employed.

The object of the present invention is to provide a horse collar wherein, in spite of the use of a fabric for the collar casing, the fore wale may not be so displaced with respect to the after wale when the hames are given a forward torsional movement, as will permit of rolling of the hames from the collar or contraction of the opening of the collar with consequent pressure against the neck of the horse and resultant interference with its breathing.

It is not new to make a horse collar of a woven fabric as I have, in common with other manufacturers, manufactured and sold horse collars in which I have used stuffed fabric casings in the formation of both the fore and after wales. Until the conception of the present invention, however, I have been unable to establish a market for fabric horse collars, for the reason that the fabric did not possess sufficient inherent stiffness to maintain proper correlative positions of the wales under working conditions. The particular difficulty encountered in the use of the old style fabric collar was the inability to retain the hames within the channel or neck between the wales when strain was applied to the hames in a forward direction, as when backing a double team or in holding back. Under these conditions, as is well known the work is taken up by the hames, through their rings and the latter are so positioned that this forward pull tends to roll the hames out of the collar, which result will occur if the fore wale, in its lower portion has any appreciable displacement with respect to the after wale.

When leather is used in the manufacture of the wale casings, the hames are held securely to the collar by reason of the inherent stiffness of the leather. When, however, canvas, ticking or other woven fabric is employed, there is no such stiffness present and as a result, the hames press the fore wale inwardly against the neck of the horse so that not only are the hames permitted to leave the collar, but the consequent pressure on the horse's neck galls it.

It is highly desirable that a collar be made of fabric, because of the cheapness of the material, the coolness of it, the ease of manipulation of the material in the manufacture of the collar and for other reasons well known to those skilled in the art, but until the production of the present invention there was not produced to my knowledge, a fabric horse collar that would retain the hames in proper working position under the adverse conditions of use, above referred to.

In the drawing:

Figure 1 is a sectional view taken longitudinally through the entire fore wale of a collar embodying the present invention, the after wale being shown in elevation;

Fig. 2 is a transverse section on line 2—2 of Fig. 1;

Fig. 3 is a sectional view on line 3—3 of Fig. 1, showing in dotted lines the position the spring plate, which is positioned against the inner face of the inner wall of the fore wale, tends to assume when the fore wale is subjected to displacing pressure incident to backing and holding back, hereinbefore referred to;

Fig. 4 is a detail perspective view showing a section of reinforced fabric from which the fore wale casing is formed, and equipped with a form of retaining spring plate that may be employed for the purpose hereinbefore described, and Fig. 5 is a perspective view of the reinforcing spring leaf.

Referring to the drawings there is shown a horse collar including an after wale 10 and a fore wale 11 between which is the neck 12, both wales being curvilinear in cross section as is usual.

In the formation of each wale, a casing is provided of proper shape and dimensions, as is usual, the casing in both instances being formed of a woven fabric or a combination of fabrics, as may be preferred. In practice, I have found it often expedient to make the entire fore wale casing of duck or canvas and to make the outer wall of the after wale casing of the same material, using ticking for the inner wall of the after wale casing. Both casings are stuffed with the usual material, to induce proper rigidity.

Upon reference to Fig. 4 of the drawing, it will be noted that the blank from which the fore wale casing is formed, is provided with a reinforcing strip 15 of fabric upon the ends of which are stitched the leather pads 16 against which are disposed the ends of a spring metal plate 17. To hold the ends of the plate in proper relation to the pads 16 while permitting longitudinal movement of the ends of the plates with respect to the pads, said ends are provided with longitudinal slots 18 through which are passed rivets 19 that are engaged through their respective pads. The object of this specific arrangement will be hereinafter explained. To increase the tension of the plate 17 at its intermediate portion a reinforcing spring leaf 20 is employed which is disposed between said plate and the fabric 15 and is provided with laterally directed integral fingers 21 which are bent to lie against the opposite face of the plate 17 so as to maintain the mutual relation of the plates while permitting flexing of the plate 17.

Upon reference to Fig. 1 of the drawing it will be noted that the spring plate of leaf 17 extends at both sides of the collar to points well up with respect to the pads 25 that receive directly the hame rings 26, the position of the hames in this view being indicated in dotted lines. With the parts so positioned it will be understood that when the fore wale tends to move under the influence of forward rolling motion of the hames the ends of the plate 17 will be subjected to transverse strains in the direction of the after wale, movement in corresponding direction being of course prevented to any appreciable degree by the after wale. Thus the spacing of opposite corresponding points of the outer periphery of the fore wale, such as the points $a$ in Fig. 2, will be at all times maintained greater than the corresponding points $b$ of the neck, so that the hames may not be rolled from the collar. In practice, such proportions and dimensions of the different parts are employed as will positively preclude such movement of the fore wale with respect to the after wale as would permit of forward rolling of the hames from the channel or groove between the wales.

While I have shown and described the present embodiment of the invention as constructed for the present market, it will of course be understood that I may change the details, their proportions and dimensions so long as I employ in connection with the fabric collar any means for holding the wales in such mutual relation as will hold the hames within the channel between them.

The object of the slotted formation of the ends of the spring plate 17 is to permit movement of such end portions with respect to the fore wale casing when the upper end of the collar is opened or closed in the application or removal of the collar, the pads 16 serving as wear plates for the end portions of the plate 17.

In further explanation of the problem to be solved to permit the use of a fabric horse collar it may be stated that the collar must be so constructed that the fore wale will be maintained with the most remote opposite points $a$ of its outer periphery, farther apart than the most remote opposite points $b$ of the neck, these corresponding points of course being in the same plane transversely of the collar.

What is claimed is:—

1. A horse collar initially conformable under pressure to a horse's neck, consisting of a pliable fabric outer wall and a filling, the collar including fore and rear wales and a connecting neck and resilient means extending from the usual point of location of a tug at one side of the collar, continuously downwardly of that side of the collar, around the throat of the collar and upwardly of the opposite side of the collar to the usual point of location of a tug at that side, for imparting to the corresponding portions of the wall of the fore wale, a degree of stiffness sufficient to prevent rolling of the most remote opposite points of the outer periphery of the fore wale inwardly a sufficient amount to permit of release of the hames, under the influence of corresponding hame pressure.

2. A horse collar initially conformable under pressure to a horse's neck, consisting of a pliable fabric outer wall and a filling, the collar including fore and rear wales and a connecting neck and resilient means extending from the usual point of location of a tug at one side of the collar, continuously downwardly of that side of the collar, around the throat of the collar and upwardly of the opposite side of the collar to the usual point of location of a tug at that side, for imparting to the corresponding portions of the wall of the fore wale, a degree of stiffness sufficient to prevent rolling of the most remote opposite points of the outer periphery of the fore wale inwardly a sufficient amount to permit of release of the hames, under the influence of corresponding hame pressure, said means being of a character to permit shaping of the collar in the plane of the fore wale.

3. A horse collar having a stiffening spring arranged within the throat portion thereof and slidably connected at its ends thereto, and a centrally disposed reinforcing member mounted upon said spring.

4. The combination with a horse collar, of a spring curved to correspond with the throat of the collar, means for slidably connecting the ends of said spring to the casing thereof and a reinforcing member embracing said spring at the center thereof.

5. A horse collar having a protecting strip secured within the casing of the fore wale around the throat of the collar, a stiffening spring slidably connected to said protecting strip at the ends thereof and a reinforcing member mounted upon said stiffening spring.

6. A horse collar having a protecting strip secured within the casing around the throat thereof, a stiffening spring arranged upon said protecting strip and slidably connected thereto and a reinforcing member embracing said stiffening spring and held in position thereon by frictional contact therewith.

7. A horse collar having a protecting strip secured within the casing of the fore wale around the throat of the collar by stitches, a stiffening spring slidably connected to said protecting strip at the ends thereof and a reinforcing member embracing said stiffening spring having fingers for holding said reinforcing member in frictional contact therewith.

8. A horse collar having a stiffening spring arranged in the casing of the fore wale around the throat thereof and loosely connected thereto and a reinforcing member slidably mounted on said stiffening spring.

9. A horse collar having a stiffening spring arranged within the fore wale thereof and slidably connected to the casing at the ends thereof and a reinforcing member embracing said stiffening spring and capable of moving thereon.

10. A horse collar, having a stiffening spring arranged within the casing against one wall thereof, and capable of moving in relation to said casing, the ends of said spring being slidably connected to the adjacent wall of said spring.

11. The combination with a horse collar, of a spring curved to correspond with the throat of the collar arranged within the casing and slidably mounted in one wall thereof, said spring having slotted ends, and fastening members passing through the slots and slidably connecting said spring to the adjacent wall of said casing.

12. A horse collar having a protecting strip secured within the casing of the fore wale around the throat of the collar, and a stiffening spring slidably connected to said protecting strip.

13. A horse collar having a protecting strip secured within the casing around the throat thereof, and a stiffening spring arranged upon said protecting strip having its ends slidably connected thereto.

14. The combination with a horse collar, of a protecting strip stitched to the inner face of the casing of the fore wale around the throat thereof, a spring arranged upon said protecting strip having slotted ends, washers arranged under the ends of the protecting strip and rivets passing through the slotted ends of said spring and connected to said washers.

15. A horse collar, having a stiffening member slidably mounted in the inner face of one wall thereof, and means for slidably connecting the ends of said spring to the adjacent wall of said casing.

In testimony whereof, I affix my signature, in the presence of two witnesses.

GEORGE B. GOETZ.

Witnesses:
 IRENE E. WEIMER,
 IRENE GALLODAY.

Copies of this patent may be obtained for five cents each, by addressing the "Commissioner of Patents, Washington, D. C."